Jan. 16, 1940. J. O. TOW 2,187,550
PIPE PERFORATING MACHINE
Filed Dec. 28, 1936
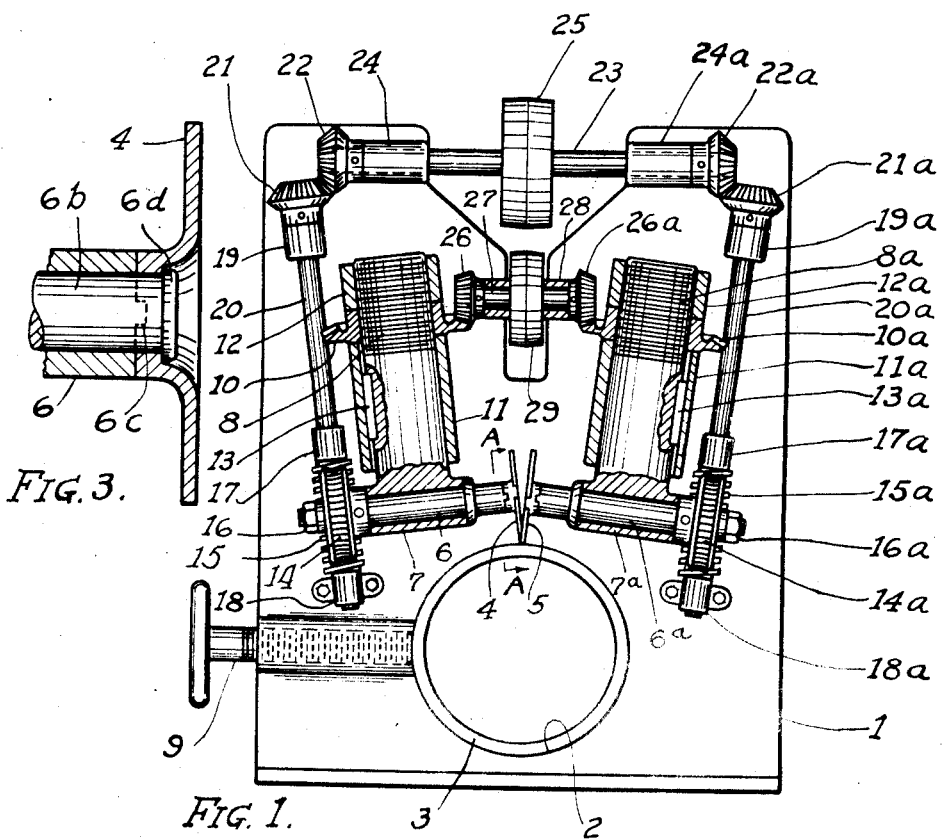
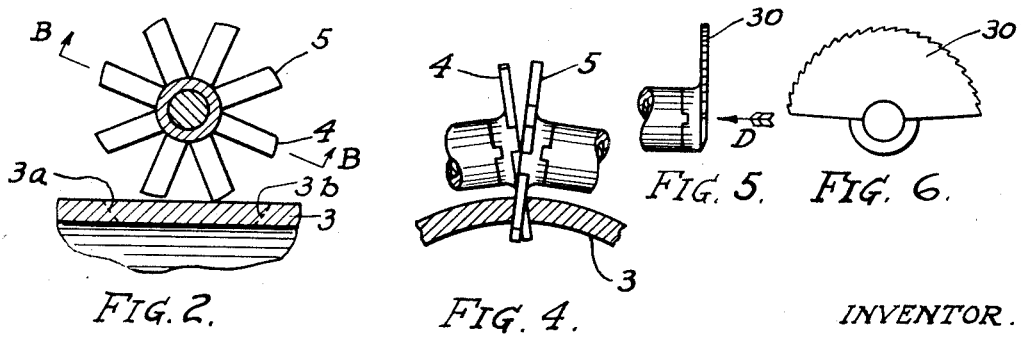
INVENTOR.
JAMES O. TOW.

Patented Jan. 16, 1940

2,187,550

UNITED STATES PATENT OFFICE 2,187,550

PIPE PERFORATING MACHINE

James O. Tow, South Pasadena, Calif., assignor to Ira J. McCullough, Los Angeles, Calif.

Application December 28, 1936, Serial No. 117,979

3 Claims. (Cl. 90—15)

The invention relates to improvements in pipe perforating machines in which a rotary cutting means is adapted to perforate the wall of a pipe or similar object by cutting an elongate slot or slots through such wall; and the objects of the improvement are, first to provide a rotary cutting means that will, in a single inward and outward movement of the cutting means, cut a slot of increasing width as such slot progresses inwardly through the wall of the pipe; second, to so construct the cutting means that it will not bind in the wall of the pipe in cutting through the same; and third to provide suitable means for operating the cutting means and for holding the pipe in proper relation thereto.

One form of the invention is illustrated in the accompanying drawing, in which

Figure 1 is a side elevation of the entire machine with certain parts in section as indicated.

Figure 2 shows the cutting means viewed as from section AA of Figure 1.

Figure 3 shows a form of construction and mounting of a portion of the cutting means.

Figure 4 shows the cutting means in position of completion of a slot and before having been withdrawn therefrom:

Figure 5 shows an alternate form of cutting means in edge elevation.

Figure 6, the same in side elevation.

The frame 1, has an opening 2, adapted to receive a length of pipe 3. A screw 9 engaged by the frame 1, is adjustable to clamp the pipe 3 securely in place. The carriage member 8, is mounted to slide longitudinally in bearings 11 and 12, which bearings are secured to or formed on the base 1, and is secured against rotation by the key 13. The upper portion of the carriage member 8 is threaded as shown to engage a threaded bore in the bevel gear 10. The bevel gear member 10, is rotatably engaged by the bevel pinion 26, which is fixed to the shaft 27, journaled in bearings one of which is shown at 28, and which bearings are secured to or formed on the base 1.

On the opposite hand the carriage 8a corresponds in structure and function to the member 8, and parts 10a, 11a, 12a, 13a and 26a, correspond to the parts 10, 11, 12, 13 and 26 above mentioned, respectively.

The pulley 29 is fixed to the shaft 27, so that by rotation of the pulley, the shaft 27, the pinions 26 and 26a and the bevel gears 10 and 10a are rotated and the threaded carriage members 8 and 8a are shifted in an upward or downward direction according to the direction of rotation of the pulley.

The carriage member 8, has formed on its lower end the bearing 7, in which is journaled the mandrel 6. The mandrel 6, has a cutter member 4, mounted on its inner end and a worm gear 14 is fixed to its opposite end. A worm 15 is fixed on the shaft 20, which shaft is journaled in the bearings 17, 18 and 19, attached to or formed on the frame 1. By means of the bevel gear 21 affixed to the shaft 20, and the mating bevel gear 22 affixed to the shaft 23, journaled in bearings 24 and 24a supported by the frame 1, rotation of the cutter 4 is had through the worm gear by application of power to the drive pulley 25, fixed on the shaft 23. In a similar manner, rotation of the cutter 5, mounted on the mandrel 6a, is had through the worm gear 14a, worm 15a, shaft 20a and bevel gears 21a and 22a. The shaft 20a is journaled in bearings 17a, 18a and 19a, which bearings are attached to or formed on the frame 1.

It will be seen by the drawing that the cutting means consists of two rotary cutters. The arrangement of the two cutters 4 and 5, with respect to one another is shown in Figures 1, 2 and 4. In Figure 1, the angular relation of the two cutters is shown as is also the approximate alignment of the ends of the teeth of one cutter with those of the other when they reach the outer surface of the pipe 3. It will be seen that as the cutters are rotated by driving the pulley 25, and lowered by rotating the pulley 29, they will cut a beveled slot in the pipe 3, as indicated by their positions in Figure 4, since the carriages 8 and 8a are arranged to slide in directions parallel to the planes of their respective cutters.

Figure 2 shows the cutters 4 and 5 as viewed in section AA, Figure 1, and the angular relation of the teeth of one cutter to those of the other is indicated. In this particular case each cutter has four teeth spaced at 90° and the teeth of one cutter alternate with those of the other so that there is no interference caused by the angular positions shown in Figures 1 and 4.

It will be apparent that by reversing the rotation of the pulley 29, the cutters may be withdrawn from the work. It will be understood that the gearing is so arranged as to direction, that both cutters will rotate in the same direction and at the same angular velocity and that both cutters will move into and out of the work together.

Figure 3 illustrates a method by which the cutter 4 may be mounted on the shaft 6. In this case a key 6c is formed on the end of the hollow shaft 6 and engages the cutter 4 to rotate the same, the cutter being held firmly in position by the bolt 6b with head 6d. A nut 16 (see Figure 1) draws the bolt tight. The cutter 5 is secured by the nut 16a in the same manner. Figure 3 is taken from section BB, of the cutter 4 only, in Figure 2.

In Figure 2, the outlines of the ends of a prospective slot are shown by the dotted lines 3a and 3b. Figure 5, shows in edge elevation an alternate form of cutter 30, and Figure 6 shows a side elevation of the same. This cutter together with a similar one but of opposite hand may be used in place of the cutters 4 and 5. In this case the cutter blade may be a little less than one-half of a circular saw so that the two cutters will not interfere with one another. It will be noted that the cutter 30 has a blade having an angular dimension of slightly less than one hundred eighty degrees. When a pair of cutters are mounted on the shafts 6 and 6a of Fig. 1, one of said cutters may be placed in the upright position shown in Figs. 5 and 6, but the other cutter will be rotated through an angle of 180° so that the blade of each cutter 30 will coincide with the space of the other cutter with the result that when the shafts 6 and 6a are rotated first one cutter 30 and then the other cutter 30 will engage the pipe to be slotted.

It will be understood that several units like that shown in Figure 1 may be used at once, arranged along the length of a pipe.

Having thus described my invention I claim:

1. In a pipe slotting machine of the character described, the combination of: means for supporting a pipe in which a slot is to be cut; a pair of rotary cutters, each of said cutters having a blade and a space; a pair of shafts disposed in substantially end to end relation and with said cutters mounted on the adjacent ends of said shaft, said shafts being disposed with the axes thereof at an angle one to the other and so that the planes of rotation of said blades of said cutters will intersect at a point offset from the said axis in the direction of the face of said pipe to be cut; means for rotating said cutters so that the blade of each cutter will coincide with the space of the other cutter; and means for substantially simultaneously feeding said shafts inwardly toward said pipe along planes substantially parallel to said planes of rotation of said blades, whereby said blades will substantially simultaneously cut in said pipe a slot having inwardly diverging side walls.

2. In a pipe slotting machine of the character described, the combination of: means for supporting a pipe in which a slot is to be cut; a pair of rotary cutters, each of said cutters having a blade and a space; a pair of cutter heads to carry said cutters; supports for said cutter heads having means for guiding said heads through paths of movement so that said cutters will move toward the surface of said pipe along planes which diverge in a direction inward from the face of said pipe; means for rotating said cutters so that the blade of one cutter will enter the space of the other cutter; and feed means for moving said cutter heads substantially simultaneously toward said pipe whereby the blades of said cutters will first engage the surface of the pipe and then pass inward through the wall of the same in inwardly diverging relation to cut a slot, the side walls of which diverge inward from the outer face toward the inner face of said wall.

3. In a pipe slotting machine of the character described, the combination of: means for supporting a pipe in which a slot is to be cut; a pair of rotary cutters each having a blade and a space, said cutters being disposed so that the blade of one cutter will coincide with the space of the other cutter; cutter heads to carry said cutters; means supporting said cutter heads so that they may be moved so as to carry said cutters substantially radially inward toward said pipe through paths which diverge in a direction inward from the surface of the pipe; means for rotating said cutters so that the blade of one will enter the space of the other; and means for moving said cutter heads toward the wall of said pipe along said diverging paths so that said blades will first engage the outer face of the wall of the pipe and then cut through said wall to form an opening, the side walls of which diverge inward from the outer face of said wall toward the inner face thereof.

JAMES O. TOW.